United States Patent
Stancil et al.

(10) Patent No.: US 6,601,168 B1
(45) Date of Patent: Jul. 29, 2003

(54) COMPUTER FAN SPEED SYSTEM TO REDUCE AUDIBLE PERCEPTIBILITY OF FAN SPEED CHANGES

(75) Inventors: Charles J. Stancil, Tomball, TX (US); Jeffrey C. Stevens, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/443,575

(22) Filed: Nov. 19, 1999

(51) Int. Cl.$^7$ .............................. G06F 9/00; G06F 1/28
(52) U.S. Cl. ........................ 713/100; 713/300
(58) Field of Search ................ 713/100, 300, 713/1

(56) References Cited

U.S. PATENT DOCUMENTS

| | | | | |
|---|---|---|---|---|
| 5,526,289 A | * | 6/1996 | Dinh et al. ............... | 700/300 |
| 5,528,229 A | * | 6/1996 | Mehta ...................... | 165/247 |
| 5,566,377 A | | 10/1996 | Lee .......................... | 361/695 |
| 5,731,954 A | | 3/1998 | Cheon ....................... | 361/699 |
| 5,805,403 A | | 9/1998 | Chemla ...................... | 365/103 |
| 5,926,386 A | * | 7/1999 | Ott et al. .................. | 318/471 |
| 5,930,110 A | * | 7/1999 | Nishigaki et al. ........ | 361/686 |
| 6,134,667 A | | 10/2000 | Suzuki et al. ............ | 713/300 |
| 6,135,718 A | | 10/2000 | Yang ......................... | 417/22 |
| 6,172,611 B1 | | 1/2001 | Hussain et al. .......... | 340/584 |
| 6,204,623 B1 | | 3/2001 | Levy et al. ............... | 318/641 |
| 6,205,547 B1 | * | 3/2001 | Davis ........................ | 713/1 |
| 6,243,656 B1 | | 6/2001 | Arai et al. ................. | 702/132 |
| 6,321,175 B1 | | 11/2001 | Nagaraj .................... | 702/132 |

FOREIGN PATENT DOCUMENTS

JP 11272365 A * 10/1999 ............ G06F/1/20

OTHER PUBLICATIONS

Alfano et al, Intelligent Thermal Management Using Brushless DC Fans, 1998, IEEE, TelCom Semiconductor.*
Variable Speed Control For a DC Fan, Mar. 1, 1990, IBM Technical Discloser Bulletin, vol. No. : 32.*
*Low Cost PC Temperature Monitor And Fan Control ASIC, Analog Devices,* Preliminary Technical Data, ADM1022, Rev. PrJ 3/99 (20 pp.).
*Independently Controlling Passive And Active Cooling In A Computer System,* Mark W. Peters et al., U.S. patent application Ser. No. 09/368,950, filed Aug. 5, 1999 (45 p.).
*Adaptive Fan Controller For A Computer System,* Gregory P. Ziarnik, U.S. patent application Ser. No. 10/036,273, filed Dec. 26, 2001 (24 p.).
*Mobile Pentium® II Processor and Pentium II Processor Mobile Module Thermal Sensor Interface Specifications,* Intel ® Corporation, AP–825, Application Note, Apr. 1998, Order No. 243724–001.
*System Managment Bus Specification,* Smart Battery System Specifications, Revision 1.1, Dec. 11, 1998, Copyright© 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG.
*Mobile Pentium® II Processor In Mini–Cartridge Package At 366 MHZ, 300 PE MHZ, and 266 PE MHZ,* Intel ® Corporation, Order No.: 245108–001.

* cited by examiner

Primary Examiner—Thomas Lee
Assistant Examiner—Suresh K Suryawanshi

(57) ABSTRACT

A fan speed controller for a computer system that calculates an internal central processing unit temperature and, in response to target fan speeds communicated over a system management bus, slowly adjusts the computer system fan speed such that audible noise associated with the fan speed change is not as perceptible as would be an immediate change in fan speed.

16 Claims, 3 Drawing Sheets

COMPUTER FAN SPEED SYSTEM TO REDUCE AUDIBLE PERCEPTIBILITY OF FAN SPEED CHANGES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to cooling a computer system. More particularly, the present invention relates to controlling a fan speed to cool a computer system. Still more particularly, the invention relates to a fan speed controller which slowly adjusts a speed of a fan to reduce the audible perceptibility of the speed change.

2. Background of the Invention

Any electrical component that has current flow through it produces heat, and computers are no exception. Heat in a computer system may be tolerable to some degree, but excess heat must be removed from the system to allow the electronic components to function properly. The response to the need to remove the heat from a computer system has in large part been the use of fans.

In the early days of computer technology, when central processing unit (CPU) speeds were low, a small fan running at a relatively low speed was sufficient to remove excess heat from the computer system. As computer system technology advances and microprocessor speeds increase, more excess heat is generated within a computer system that must be removed. Computer system designers have resorted to increased number of fans, larger fans, and fans having higher speeds. Indeed, given the present state of the art in computer system design, many CPU's have a dedicated fan to thermally cool just the CPU, and the computer system itself has a second fan to cool the remaining components.

As the number of fans and fan speeds has increased, so too has the audible noise associated with these fans. Computer system users are becoming increasingly aware of audible noise associated with their computer system fans. This is especially true of users of desktop computers, which by definition, sit on or near one's desktop, and laptop computers which may be used remotely on battery power. For obvious reasons, it is undesirable for a user to be distracted by fan noise from the computer.

Computer system designers and computer system users of laptops are also acutely aware of battery life for their systems. The larger a fan or the faster a fan runs affects the amount of power drawn from the laptop's battery and therefore the fan itself can significantly diminish battery life for laptop computers. Recently, similar concerns for the general conservation of energy have driven computer system manufacturers to find ways to reduce power consumption in desktop computers as well.

The combination of heightened awareness of audible noise associated with computer fans and concerns for energy conservation have driven manufacturers of computer systems to reduce computer system fan speeds when the thermal load in the computer system so allows. That is, when the volume of airflow needed to cool a computer system is less than the volume of airflow that could be moved by a fan operating at full speed, the computer system fan speed is reduced or is completely shut off. Some computers, therefore, have a somewhat variable fan speed control which may be sensitive to temperature detected by temperature sensors. Reduced fan speed not only decreases computer system power consumption but also reduces audible noise levels associated with the speed of the fan.

While computer systems having a variable speed fan control have addressed to some extent the problems of audible noise and power consumption generally, a new problem arises with changing the speed of a fan. FIG. 1 shows a graph plotting desired fan speed as a function of time. Prior to time t', the speed of the fan is set at N. At or near time t', conventional computer system components or software determine that the speed needs to increase to N+3 to shed the computer of excess heat. Having determined that N+3 is the desired speed, such computer systems instantaneously change the fan speed set point from N to the new speed, N+3. Given the increased set point, the computer system fan rapidly changes speed from N to N+3. This change in speed may occur in less than one second. This rapid change in fan speed creates an annoying change in audibly perceptible noise.

Computer system users typically become accustomed to a particular level of background noise, whatever that level happens to be. If the computer system is a desktop having a fan speed set at N, the user may be only subconsciously aware of the background noise associated with the fan. However, it has been found that users become consciously aware of changes in audible noise associated with rapid changes in fan speed. What is needed then is a way to fulfill the goal of having a variable fan speed control that reduces or eliminates the audible annoyance conventional variable speed fans cause.

BRIEF SUMMARY OF THE INVENTION

The problems noted above are solved in large part by a fan control device that slowly adjusts the fan speed from a previous speed of the fan, which constituted a previous thermal balance for the computer system, to a target fan speed, which constitutes a new thermal balance given the current heat load in the computer system.

In the preferred embodiment, a fan controller receives a target fan speed from the CPU over a system management bus. Given the target fan speed, the fan controller adjusts the fan speed output from a previous speed towards the target speed slowly such that the audible signature associated with accelerating or decelerating a fan is minimized and therefore not made perceptible, or at least as perceptible, to the computer system user.

BRIEF DESCRIPTION OF THE DRAWINGS

For a detailed description of the preferred embodiments of the invention, reference will now be made to the accompanying drawings in which.

CATALOG OF ELEMENTS

Figure 1:
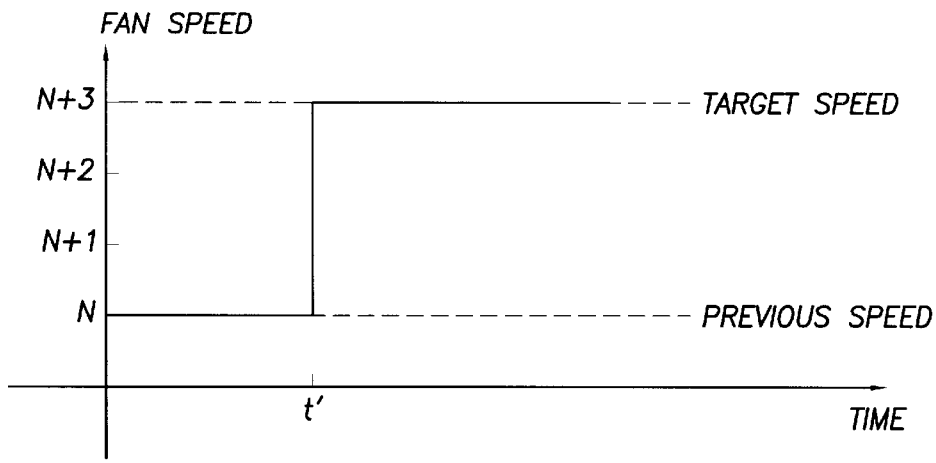
FIG. 1 shows a prior art fan speed set point change.

As an aide to correlate the terms of claims to the exemplary drawings, the following catalog of elements is provided:

10 central processing unit
12 main memory
14 North bridge
16 CPU bus
18 memory bus
20 primary expansion bus
22 PCI device
24 South bridge
25 BIOS ROM
26 fan controller
28 system management bus
30 temperature sensor
32 amplifier
34 fan
36 target fan speed register
38 ramp logic
40 Speed output register
42 digital to analog converter
44 CPU temperature logic circuit
46 up/down counter
48 ramp rate register
50 compare logic
52 clock logic
54 division logic

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 2:
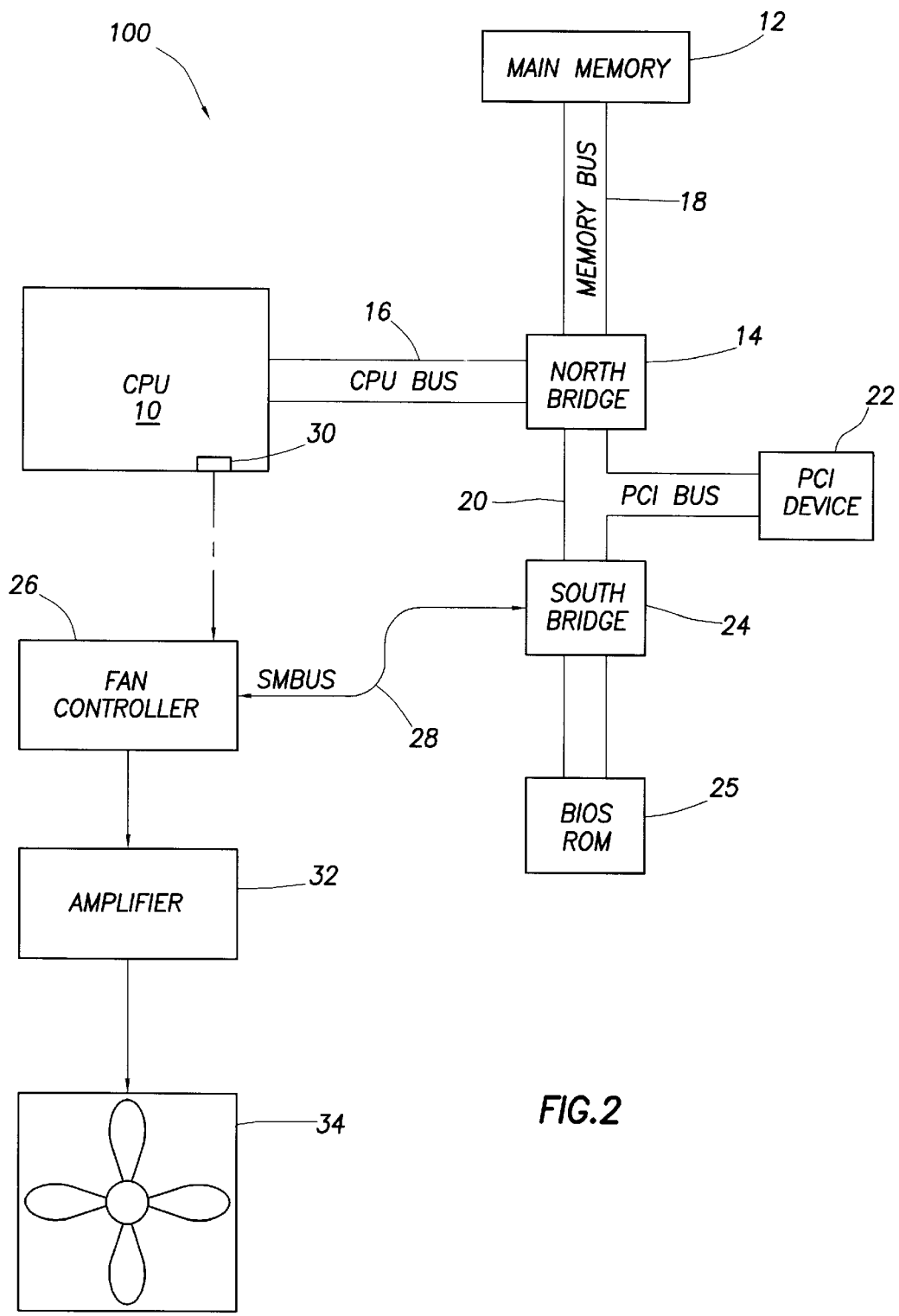
FIG. 2 is a block diagram representation of a computer system.

Referring now to FIG. 2, computer system 100, in accordance with the preferred embodiment, preferably comprises a processor or CPU 10 coupled to a main memory array 12 through an integrated bridge logic device 14. As depicted in FIG. 2, the bridge logic device 14 is sometimes referred to as a "North bridge," based generally upon its location within a computer system drawing. The CPU 10 preferably couples to the bridge logic 14 via a CPU bus 16, or the bridge logic 14 may be integrated into the CPU 10. The CPU 10 may comprise, for example, a Pentium II® or Pentium III® microprocessor manufactured by Intel®. It should be understood, however, that other alternative types of microprocessors could be employed. Further, an embodiment of computer system 100 may include multiple processors, with each processor coupled through the CPU bus 16 to the bridge logic unit 14.

The main memory array 12 preferably couples to the bridge logic unit 14 through a memory bus 18, and the bridge logic 14 preferably includes a memory control unit (not shown) that controls transactions to the main memory by asserting the necessary control signals during memory accesses. The main memory array may comprise any suitable type of memory, such as dynamic random access memory (DRAM), or any of the various types of DRAM devices.

The North bridge 14 bridges various buses so that data may flow from bus to bus even though these buses may have varying protocols. In the computer system of FIG. 2, the North bridge 14 couples to a primary expansion bus 20, which in the preferred embodiment is a peripheral component interconnect (PCI) bus. If the chip set of the computer system 100 is implemented using Intel® devices, the primary expansion bus 20 will not be a PCI bus, but rather, will be a "hublink" proprietary bus developed by Intel®. In this case, the South bridge 24 will bridge a PCI bus being a secondary expansion bus, and PCI devices will reside on that secondary expansion bus off the South bridge device. FIG. 2 also shows a PCI device 22 coupled to the primary expansion bus 20. PCI device 22 may be any suitable device such as a modem card or a network interface card (NIC). One skilled in the art will realize that multiple PCI devices may be attached to PCI bus 20, yet for clarity of the figures, only one is shown.

The preferred embodiment further includes a second bridge logic device, a South bridge 24, coupled to the primary expansion bus 20. This South bridge 24 couples, or bridges, the primary expansion bus 20 to other secondary expansion buses. These other secondary expansion buses may include an industry standard architecture (ISA) bus, a sub-ISA, a universal serial bus (USB), and/or any of a variety of other buses that are available or may become available in the future. In the embodiment shown in FIG. 2, the South bridge 24 bridges Basic Input Output System (BIOS) Read Only Memory (ROM) 25 to the primary expansion bus 20, therefore, programs contained in the BIOS ROM 25 are accessible by the CPU 10.

The BIOS ROM 25 contains firmware embedded on a ROM memory chip and performs a number of low-level functions. For example, the BIOS executes the power on self test (POST) during system initialization ("boot-up"). The POST routines test various subsystems in the computer system, isolate faults and report problems to the user. The BIOS also is responsible for loading the operating system into the computer's main system memory. Further, the BIOS handles the low-level input/output transactions to the various peripheral devices such as the hard disk drive and floppy disk drives.

Also shown in FIG. 2 is a fan controller 26 coupled to the CPU 10 via a System Management Bus (SMBus) 28. The fan controller 26 preferably couples to a temperature sensor 30 which preferably is embedded physically in CPU 10 and senses the temperature of the core or die of the CPU. The fan controller reads a voltage from the temperature sensor 30 and calculates a CPU temperature based on that voltage.

Figure 3:
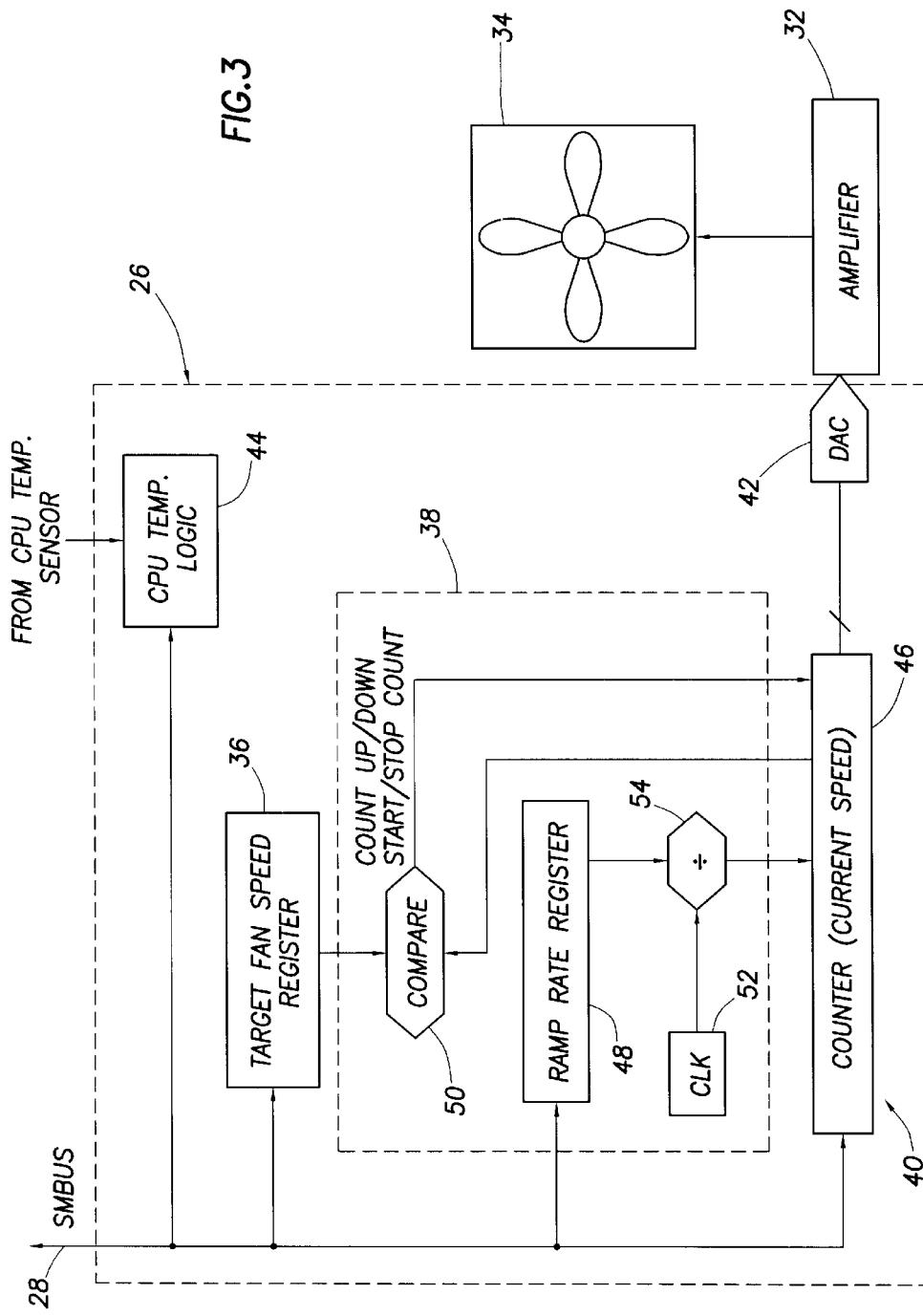
FIG. 3 is a block diagram drawing of one implementation of the invention.

FIG. 3 shows a block diagram implementation of the fan controller 26. As explained above, the fan controller 26 communicates with the CPU 10 over the System Management Bus 28. The SMBus 28 is a serial two-way data path wherein the CPU 10, by executing the BIOS, polls the fan controller 26 for the actual CPU die temperature, calculates a new target fan speed based, in part, on the CPU temperature, and then writes the new target fan speed to the target fan speed register 36. Further, on system start up the CPU 10 writes a ramp rate to the ramp logic 38. It will be understood however, that the fan controller 26 will have a default ramp rate and therefore the CPU need not write a new ramp rate to the ramp logic 38 if the default ramp rate is acceptable for use in the particular computer system implementation. The ramp rate for a particular system is determined during the design process and is a function of the size and audible signature of the particular fan used. As a fan's operating speed increases, the frequency of audible noise associated with that fan increases. Therefore, a noisy high pitched fan dictates a slower ramp rate to reduce audible noise perceptibility.

Further, the CPU 10 also preferable writes a speed output value to the speed output register 40. As indicated in FIG. 3, the speed output register couples to the Digital to Analog Converter (DAC) 42 which couples directly or indirectly to the fan 34. Therefore, writing a value to the speed output register 40 has the effect of instantaneously changing the fan speed, within the acceleration limits of the fan, and having the CPU write directly to the speed output register 40 preferably is limited only to boot sequences. Much like the ramp rate contained in the ramp logic 38, the speed output register 40 has a default initial speed and if the default initial speed is acceptable for use in the particular system to minimize audible noise perceptibility, the CPU need not write a different value to the speed output register 40 during a boot sequence.

Fan controller 26 further comprises a CPU temperature logic 44. As the name implies, the CPU temperature logic 44 calculates the CPU die temperature by reading temperature sensor 30 embedded in the CPU (FIG. 2). By reading a voltage created across sensor 30, the CPU temperature logic 44 calculates the die temperature of the CPU 10. More specifically, the CPU temperature logic circuit 44 applies a small current to sensor 30 which is preferably a P-N junction diode. The voltage created across the P-N junction is a function of the current flow and temperature of the junction. As discussed above, the CPU 10 periodically polls the CPU temperature logic circuit 44 over the SMBus 28, and based on the temperature read, determines a desired fan speed. The determination is either by mathematical calculation, or the BIOS program looks up in a look-up table a desired fan speed as a function of the CPU temperature. The mathematical calculation will vary depending on the computer system characteristics (CPU speed, fan speed, thermal loading, air flow characteristics within the chassis). However, the calculated speed preferably is based on, is a mathematical function of, the CPU 10 temperature.

The fan controller 26 has a value stored in the speed output register 40 which is converted by the digital to analog converter 42 to an analog value which is coupled to the fan 34. The CPU 10 polls the CPU temperature logic 44 to determine a temperature of the core of the CPU 10. Based on this CPU temperature, the CPU writes, over the SMBus 28, a target fan speed value to the target fan speed register 36. Ramp logic 38 compares the value stored in the target fan speed register to the value stored in the speed output register and slowly ramps the value of the speed output register, preferably over a matter of seconds until the value of the speed output register 40 and target fan speed register 36 match. The rate at which ramp logic 38 changes the value of the speed of the output register preferably is set such that the change in fan speed is not noticeable or distracting, which distracting feature is the case in conventional computer systems.

The speed output register 40 preferably is an up/down counter 46. This up/down counter 46 contains a value representing a current fan speed set point. Also shown coupled to the SMBus 28 is a ramp rate register 48 which operates as described above. When the CPU 10 writes a new target fan speed value to the target fan speed register 36 over the SMBus 28, compare logic 50 compares the value of the target fan speed register to the value stored in the up/down counter 46. Based on this comparison, compare logic 50 generates control signals that are coupled to the up/down counter 46. The compare logic 50 preferably generates a signal that informs the up/down counter 46 to count either up or down. Further, the compare logic 50 preferably generates a signal indicating to the up/down counter 46 when to start to count. In operation, when a new target fan speed value is written to the target fan speed register 36, the compare logic 50 generates the necessary signals to couple to the up/down counter 46 to start the counter incrementing toward the target fan speed. When the value stored in the up/down counter 46 is equal to the value stored in the target fan speed register 36, compare logic 50 stops the counter and the adjustment is complete.

The up/down counter 46 in this implementation preferably increments the value stored therein by one bit. For example, if the up/down counter 46 has eight bits, there are 256 possible steps before the counter rolls over. This eight bit binary number may be assigned any relevant range of values. Speaking in binary terms, if the target fan speed register contains the binary number 101(decimal 5) and the up/down counter 46 hold a previous value of 011(decimal 3), the compare logic 50 compares these two values and starts the up/down counter 46 counting toward the target fan speed value. In this example, the value in the up/down counter 46 would transition to binary 100 and then to binary 101 whereupon the values between the two registers would equal and the compare logic stops the progression. It will be understood however that the binary numbers may be assigned particular values, e.g. the 256 values in an eight bit system could represent a 0–500 rpm fan speed, in which case, each increment of the eight bit word would represent roughly 2 rpms.

Figure 4:
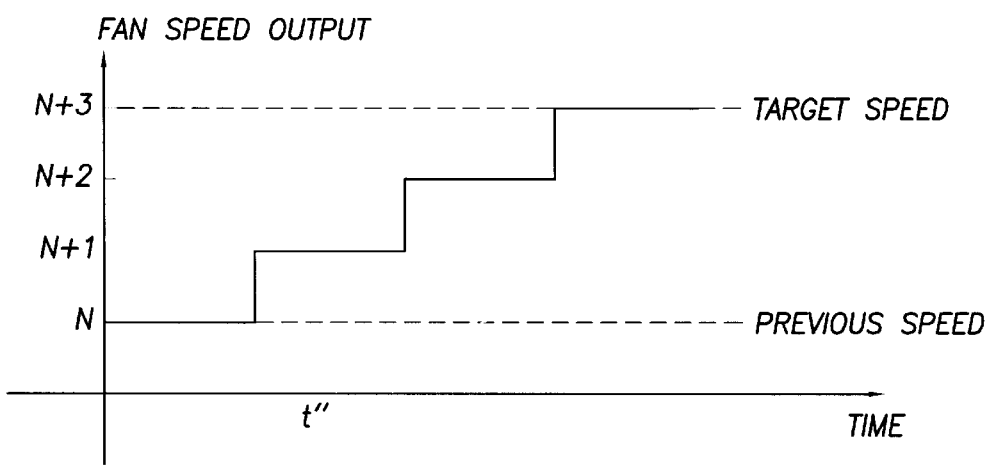
FIG. 4 is a graph showing change in target fan speed over time.

FIG. 4 shows an exemplary change in fan speed output as a result of the preferred embodiment of the invention. In FIG. 4, N represents a previous target fan speed to which the fan has already been adjusted. At some time just prior to time T", a new target fan speed N+3 is written to the target fan speed register. Rather than immediately changing the fan speed output to be N+3 as is done in conventional systems (see FIG. 1), the fan speed output preferably gradually changes from N to N+3. Given that ramp logic 38 preferably includes an up/down counter 46, this gradual change preferably is up/down counter 46 counting in one bit increments. Therefore, the transition from fan speed N to the target fan speed of N+3 is performed in three steps (N to N+1, N+1 to N+2, N+2 to N+3). For illustrative purposes only, assume the binary value of N is binary 100. The binary value of N+3 is therefore binary 111. Transitioning from N to N+3 then involves up/down counter 46 counting as follows: binary 100 to binary 101; binary 101 to binary 110, binary 110 to binary 111. This transition is done with a rate based value stored in the ramp rate register 48.

In the embodiment shown in FIG. 3, some mechanism must exist to control the rate at which the fan speed output value contained in the up/down counter 46 increments. In this embodiment the rate is controlled by how fast the up/down counter 46 counts. This is preferably accomplished by varying the frequency of the clock applied to the up/down counter 46. FIG. 3 shows a clock logic 52 coupled to division logic 54. Division logic 54 divides the clock frequency by the value contained in the ramp rate register 48. The divided clock signal output of division logic 54 is provided to the up/down counter 46. The clock signal provided from clock logic 52 and applied to the division logic 54 may be either internally generated within the fan controller 26 or may be generated external to the fan controller. As previously described, ramp rate register 48 contains a default ramp value or may be written with a different ramp rate value by the CPU during the system boot sequence. The rate at which the up/down counter 46 counts then is controlled by the amount which the clock frequency from clock logic 52 is divided by the value of the ramp rate register 48.

Referring still to FIG. 3, fan controller 26 further couples to amplifier 32. Amplifier 32 receives the analog signal from the DAC 42 and amplifies and conditions (e.g. filtering) the analog signal as necessary before applying it to fan 34. Fan 34 is preferably a typical computer system fan most commonly having a direct current (DC) motor (not shown) attached to the fan blades. Any suitable fan motor could be used including, but not limited to, a brushless direct current fan motor.

The above discussion is meant to be illustrative of the principles and various embodiments of the present invention. Numerous variations and modifications will become apparent to those skilled in the art once the above disclosure is fully appreciated. For example, the preferred embodiment has been directed to a fan controller having an analog or linear output to be coupled to the fan. One of ordinary skill in the art will realize the invention is applicable to any signal applied to a fan. For example, the fan controller 26 could implement a pulse width modulated scheme in which fan speed is a function of pulse width or duty cycle. Further, it may be possible to use an alternating current (AC) motor rather than a DC motor to supply mechanical power to the fan, and in this instance, fan speed is dictated according to the frequency of the AC voltage provided for the motor.

The specification herein has also disclosed that the fan controller reads a value from a temperature sensor with the CPU and uses that value to calculate a CPU internal temperature. This calculated CPU temperature is read by a BIOS program executed by the CPU over the SMBus and a target fan speed is calculated. However, some CPU's such as Xeon® manufactured by Intel® may be capable of reading and calculating their own internal temperatures. If such a CPU is used, the CPU need not poll the fan controller but instead may just write a target fan speed to the fan controller and such would still be within the contemplation of this invention.

Finally, the fan controller as disclosed herein couples to the CPU via the SMBus. However, one of ordinary skill in this art will appreciate that there are other ways to have the fan controller be in communication with the CPU. For example, the fan controller could reside on either of the primary or secondary buses.

It is intended that the following claims be interrupted to embrace all such variations and modifications.

What is claimed is:

1. A computer system, comprising:
    a CPU;
    a system memory coupled to said CPU via a bridge device;
    a fan capable of operating at various speeds to thermally cool said CPU;
    a BIOS ROM coupled to said CPU and containing a fan speed program executed by the CPU, said fan speed program permits the CPU to determine a target speed value that represents a desired fan speed based on a CPU internal temperature; and
    a fan controller coupled to said CPU and having a fan speed signal coupled to said fan, said fan controller adjusts the fan speed signal to match the target speed value, said fan speed signal having at least one intermediate value between a previous fan speed value set by the fan speed program and said target speed value.

2. The computer system as defined in claim 1 wherein said fan controller adjusts the fan speed signal to match the target speed value in at least two discrete steps and said intermediate value comprises one of those at least two discrete steps.

3. The computer system as defined in claim 1 wherein said CPU writes the target speed value to said fan controller.

4. The computer system of claim 3 wherein the computer system includes a system management bus and said CPU writes the target speed value to the fan controller over a system management bus.

5. The computer system as defined in claim 1 wherein said fan speed program executed by the CPU writes a ramp rate value to said fan controller to set the rate at which the fan controller adjusts the fan speed signal to match the target speed value.

6. The computer system as defined in claim 5 wherein said computer system includes a system management bus and said fan speed program executed by the CPU writes the ramp rate value to the fan controller over the system management bus.

7. The computer system as defined in claim 1 wherein said fan speed signal is an analog signal coupled to said fan.

8. The computer system as defined in claim 1 further comprising:
    said CPU having an internal temperature sensor; and
    said fan controller reads the CPU internal temperature sensor and calculates the CPU internal temperature.

9. A fan control device in a computer system, the fan control device comprising:
    a target speed register coupled to a bus that is loaded to contain a target speed value;
    a speed output register coupled to said bus that contains a digital fan speed value;
    a digital to analog converter (DAC) coupled on a digital side to said speed output register, said DAC converts the digital fan speed value to an analog voltage; and
    a ramp logic that changes the digital fan speed value to equal the target speed value, said change in digital fan speed value having an intervening value between a previous fan speed value and said target speed value.

10. The fan control device as defined in claim 9 wherein the ramp logic further comprises:
    a ramp rate register coupled to said bus that is loaded to contain a fan ramp rate; and
    a compare logic having a first input coupled to the target speed register and a second input coupled to the speed output register.

11. The fan control device as defined in claim 9 wherein said bus is a system management bus.

12. The fan control device as defined in claim 10 further comprising:
    said speed output register is an up/down counter;
    a counter enable output signal from said compare logic coupled to said up/down counter that enables the up/down counter; and
    a clock logic coupled to said up/down counter to generate a counter clock having a frequency based on a frequency of a first clock and the contents of the ramp rate register.

13. The fan control device as defined in claim 12 wherein said clock logic generates said counter clock by dividing the frequency of the first clock by the contents of the fan ramp register.

14. A method of controlling a fan in a computer system, comprising:

executing a fan speed program;

determining a desired fan speed value based on an internal CPU temperature by the fan speed program; and changing a fan speed output signal until said fan speed output signal matches the desired fan speed, said fan speed output signal having at least one intervening speed between a previous fan speed output value determined by the fans speed program and the desired fan speed value.

15. The method as defined in claim 14 wherein changing the fan speed output further comprises:

writing a target fan speed value to a target fan speed register;

comparing the target fan speed register to a speed output register containing the fan speed output value; and changing the value in the speed output register to match the target speed register in at least two discrete steps.

16. The method as defined in claim 14 wherein the step of determining said desired fan speed value further comprises looking in a lookup table to determine the desired fan speed value.

* * * * *